United States Patent
Paschkowski et al.

(10) Patent No.: US 8,084,527 B2
(45) Date of Patent: Dec. 27, 2011

(54) HOTMELT ADHESIVE WITH GOOD ADHESION TO POLYOLEFINS

(75) Inventors: Kai Paschkowski, Jork (DE); Joerg Plaumann, Hamburg (DE)

(73) Assignee: Sika Technology AG, Baar (CH)

( * ) Notice: Subject to any disclaimer, the term of this patent is extended or adjusted under 35 U.S.C. 154(b) by 157 days.

(21) Appl. No.: 12/292,137

(22) Filed: Nov. 12, 2008

(65) Prior Publication Data

US 2009/0142610 A1   Jun. 4, 2009

(30) Foreign Application Priority Data

Dec. 4, 2007   (EP) .................................... 07122250

(51) Int. Cl.
| | |
|---|---|
| *C08K 5/16* | (2006.01) |
| *C08K 3/28* | (2006.01) |
| *C08J 5/18* | (2006.01) |
| *C09J 133/00* | (2006.01) |
| *C09J 133/24* | (2006.01) |

(52) U.S. Cl. .......... 524/217; 524/236; 525/55; 525/127; 525/374; 525/540; 528/80; 428/515; 428/354; 428/355 R; 428/520

(58) Field of Classification Search ............... 524/236, 524/217; 528/80; 525/55, 127, 123, 374, 525/540, 69; 428/354, 515, 355 R, 520
See application file for complete search history.

(56) References Cited

U.S. PATENT DOCUMENTS

| | | | | |
|---|---|---|---|---|
| 5,241,014 | A | 8/1993 | Kehr et al. | |
| 5,574,078 | A * | 11/1996 | Elwakil | 523/161 |
| 5,910,527 | A * | 6/1999 | Alper et al. | 524/274 |
| 5,994,474 | A * | 11/1999 | Wey et al. | 525/288 |
| 2002/0010256 | A1* | 1/2002 | Reski et al. | 524/502 |
| 2007/0135563 | A1* | 6/2007 | Simmons et al. | 524/570 |

FOREIGN PATENT DOCUMENTS

| | | |
|---|---|---|
| DE | 40 00 695 A1 | 7/1991 |
| EP | 1 535 990 A1 | 6/2005 |
| WO | WO 98/26021 A1 | 6/1998 |
| WO | WO 98/58036 A1 | 12/1998 |
| WO | WO 2007/008765 * | 1/2007 |

* cited by examiner

*Primary Examiner* — James J Seidleck
*Assistant Examiner* — Deve E Valdez
(74) *Attorney, Agent, or Firm* — Oliff & Berridge, PLC

(57) ABSTRACT

The present invention relates to hotmelt adhesive compositions which comprise at least one thermoplastic polyolefin (P) which is solid at 25° C., and also at least one amide (A) of the formula (I) or (II).

Figure 1:
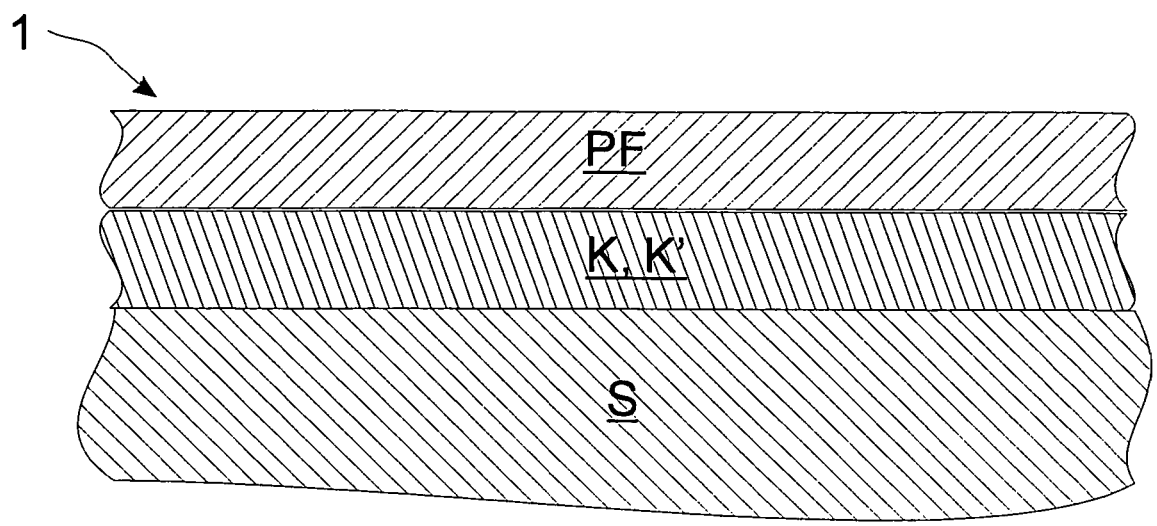

These hotmelt adhesive compositions are suitable more particularly for the adhesive bonding of polyolefin films. More particularly it is possible to form assemblies of a substrate (S) and polyolefins bonded with a hotmelt adhesive.

24 Claims, 1 Drawing Sheet

HOTMELT ADHESIVE WITH GOOD ADHESION TO POLYOLEFINS

FIELD OF THE INVENTION

The present invention pertains to the field of hotmelt adhesives, more particularly for the bonding of polyolefin films.

DESCRIPTION OF THE PRIOR ART

As substrates, polyolefins are very difficult to bond. Since, however, polyolefins specifically are extremely important materials of construction, it is all the more important to be able to bond them reliably. Hence, on the one hand, attempts have already been made for some considerable time to make the polyolefins more adhesion-friendly by means of suitable surface modification methods, such as various plasma methods or gas-phase fluorinations, for example. Moreover, diverse primers have been developed that are intended to ensure the adhesive bonding of polyolefins. Thus, for example, it has been possible to achieve very good results in the adhesive bonding of polyolefin films by means of polyurethane hotmelt adhesives and a corresponding polyolefin primer.

In the field of the adhesives as well, however, efforts have been made to carry out reliable adhesive bonding of polyolefins. It has been found that hotmelt adhesives in particular, more particularly hotmelt adhesives based on thermoplastic polyolefins, are especially suitable for this purpose.

U.S. Pat. No. 5,994,474 discloses hotmelt adhesives based on silane-grafted, amorphous poly-α-olefins.

In the course of production, machining, and application, the tools utilized for these adhesives are in many cases greatly fouled, or their function impaired, by adhering cured adhesives. Adhesions of this kind are particularly disruptive on rollers, rotating parts such as shafts or rolls, and in parts which are intended to form the thermoplastic adhesives, such as extrusion dies, pressure rollers or laminating tools, for example. In order to prevent such adhesions, therefore, these critical tool surfaces are often coated with Teflon.

It has now been found, however, that adhesives which are intended to produce good adhesion to polyolefins also, unfortunately, exhibit marked adhesion to such Teflonized surfaces.

SUMMARY OF THE INVENTION

It is an object of the present invention, therefore, to provide adhesives which on the one hand exhibit good adhesion to polyolefins but on the other hand exhibit little or no adhesion to Teflon or Teflonized surfaces.

Surprisingly it has now been found that hotmelt adhesive compositions according to claim 1 are able to achieve this object.

Further aspects of the present invention are a use according to claim 14 of the hotmelt adhesive composition for the adhesive bonding of polyolefin films, an assembly according to claim 16, and a method according to claim 19 of producing such an assembly.

Preferred embodiments of the invention are subject matter of the dependent claims.

DESCRIPTION OF THE PREFERRED EMBODIMENTS

The invention relates to hotmelt adhesive compositions which comprise at least one thermoplastic polyolefin (P) being solid at 25° C.

at least one thermoplastic polyester (TPE) being solid at 25° C.

at least one amide (A) of the formula (I) or (II)

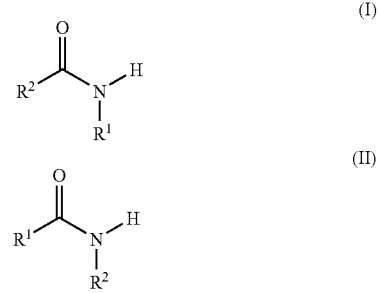

In these formulae $R^1$ is H, a $C_1$-$C_4$-alkyl group or a benzyl group and $R^2$ is a saturated or unsaturated $C_8$-$C_{22}$-alkyl group.

By unsaturated here is meant 'containing double or triple carbon-carbon bonds'. The radicals may also be multiply unsaturated, i.e. there may also be two or more such double and/or triple bonds present in the same radical. If this is the case, these multiple bonds may be present in conjugation relative to one another or in isolation from one another.

The radicals $R^1$ and/or $R^2$ may independently of one another be branched or unbranched. Preferably, however, the radicals are unbranched. Branches in the immediate vicinity of the amide group, in particular, are a disadvantage. It is therefore preferred that the carbon which is connected directly to the nitrogen atom, or to the carbon atom, of the amide group is a carbon which carries a hydrogen atom, more particularly a methylene carbon. The radicals $R^2$ of the amides of the formula (I) preferably have an uneven number of carbon atoms, while the radicals $R^2$ of the amides of the formula (II) preferably have an even number of carbon atoms.

The amide (A) preferably has a melting point of between 40 and 150° C., preferably between 50 and 110° C.

In one embodiment the amide (A) is an amide of the formula (I).

Preferred amides (A) of the formula (I) have an H as substituent $R^1$. This class of compound of the primary amides are known to the skilled person by the term 'fatty acid amides'. However, not all fatty acid amides are equally suitable. In particular, fatty acids with an alkyl radical of more than 22 carbon atoms are not suitable.

Fatty acid amides $R^2CONH_2$ of this kind can be realized, for example, through the reaction of the corresponding fatty acids $R^2COOH$ with ammonia.

The amides (A) of the formula (I) in which $R^1$ is a $C_1$-$C_4$-alkyl radical or a benzyl radical can be prepared, for example, by N-alkylations of the corresponding fatty acid amide $R^2CONH_2$ by means of alkyl halogens, or can be obtained from the reaction of a $C_1$-$C_4$-alkylamine or benzylamine with the corresponding fatty acid $R^2COOH$.

In a further embodiment the amide (A) is an amide of the formula (II). Such amides can be prepared from the reaction of fatty acid amines $R^2NH_2$ with the respective carboxylic acid $R^1COOH$, or the respective acid chlorides $R^1COCl$. The fatty amines used for this purpose, in turn, are typically prepared by reduction from the corresponding fatty acid amides or directly from the corresponding fatty acids.

The amides (A) are preferably technical mixtures of amides with radicals $R^2$, $R^3$ or $R^4$ having different lengths, and more particularly are technical mixtures of fatty acid amides.

In one embodiment the radical $R^2$ is more particularly an unsaturated $C_8$-$C_{20}$-alkyl radical, more particularly a $C_nH_{2n-1}$-alkyl radical or $C_nH_{2n-3}$-alkyl radical or $C_nH_{2n-5}$-alkyl radical with n=8-20, preferably an olefinically unsaturated alkyl radical.

In another embodiment the radical $R^2$ is a $C_8$-$C_{22}$-alkyl radical, more particularly a $C_{15}$-$C_{22}$-alkyl radical.

Particularly preferred amides (A) of the formula (I) are selected from the group consisting of lauryl-, myristyl-, palmityl-, stearyl-, arachidyl-, tuberculostearyl-, palmitoleyl-, oleyl-, linoleyl-, linolenyl-, elaeostearyl-, erucyl-and arachidonylamide.

Preference is given to amides (A) of the formula (I), more particularly stearylamide or erucamide. The most preferred amide (A) is erucamide.

The hotmelt adhesive composition further comprises at least one thermoplastic polyolefin (P) which is solid at 25° C.

Preferred thermoplastic polyolefins (P) are poly-α-olefins.

In one preferred embodiment the thermoplastic polyolefin (P) is an atactic poly-α-olefin (APAO) (P1). These atactic poly-α-olefins can be prepared by polymerization of a-olefins, more particularly of ethene, propene, 1-butene, with Ziegler catalysts, for example. Homopolymers or copolymers of α-olefins can be prepared. In contrust to other polyolefins they have an amorphous structure. Preferably the thermoplastic polyolefins (P) have a softening point (measured by the ring & ball method, along the lines of DIN EN 1427, for example) of above 90° C., more particularly between 90° C. and 130° C. The molecular weight $M_n$ is more particularly between 7000 and 25 000 g/mol.

In a further preferred embodiment the thermoplastic polyolefin (P) is a silane-grafted poly-α-olefin (P2), more particularly a silane-grafted atactic poly-α-olefin (APAO).

Silane-grafted poly-α-olefins of this kind are very well known to the person skilled in the art. They can be obtained, for example, by the grafting of unsaturated silane, such as vinyltrimethoxysilane, onto a poly-α-olefin. A detailed description of the preparation of such silane-grafted poly-α-olefins is disclosed for example in U.S. Pat. No. 5,994,747 and DE 40 00 695 A1, the content of which is hereby incorporated by reference into the present specification.

Additionally preferred as silane-grafted poly-α-olefins are silane-grafted poly-α-olefins which are obtained by means of metallocene catalysts, more particularly silane-grafted polypropylene homopolymers or polyethylene homopolymers of this kind.

With particular preference the hotmelt adhesive composition comprises at least one above-described atactic poly-α-olefin (APAO) (P1) and also at least one above-described silane-grafted poly-α-olefin (P2) as thermoplastic polyolefins (P). With particular preference the weight ratio of atactic poly-α-olefin (APAO) (P1) to silane-grafted poly-α-olefin (P2) is between 5:1 and 1:5, preferably between 1:1 and 1:4.

The amount of amide (A) used is advantageously such that the hotmelt adhesive composition contains an amount of $\geq$5% by weight, more particularly of 5.0%-20.0% by weight, preferably 7.0%-15.0% by weight, based on the hotmelt adhesive composition.

The amount of thermoplastic polyolefin (P) used is advantageously such that the hotmelt adhesive composition contains an amount of thermoplastic polyolefin (P) of $\geq$50% by weight, more particularly 50%-95% by weight, preferably 60%-80% by weight, based on the hotmelt adhesive composition.

The hotmelt adhesive composition further comprises at least one thermoplastic polyester (TPE) being solid at 25° C., more particularly in an amount of 5%-30% by weight, preferably of 7%-15% by weight, based on the hotmelt adhesive composition.

The thermoplastic polyester (TPE) is solid at room temperature. For the thermoplastic polyesters, preference is given to crystalline, preferably aromatic, thermoplastic polyesters (TPE). Particularly suitable such thermoplastic polyesters (TPE) are polycaprolactone copolyester urethanes.

They have more particularly a melt flow index (DIN 53 735) of more than 15 g/10 min, preferably of 25-100 g/l10 min (170° C., 2.16 kg), and more particularly an OH number of less than 5 mg KOH/g, preferably of less than 4 mg KOH/g.

As and when required it is also possible for further thermoplastic polymers to be present. These are, more particularly, homopolymers or copolymers of at least one monomer which is selected from the group consisting of ethylene, propylene, butylene, isobutylene, isoprene, vinyl acetate, vinyl esters of higher carboxylic acids, and esters of (meth)acrylic acid. Particularly suitable as such additional thermoplastic polymer are ethylene-vinyl acetate copolymers.

The hotmelt adhesive composition further preferably comprises at least one catalyst which catalyzes the reaction of silane groups, more particularly in an amount of 0.01%-1.0% by weight, preferably of 0.1%-0.5% by weight, based on the hotmelt adhesive composition. Such catalysts include, more particularly, organotin compounds, preferably dibutyltin dilaurate (DBTL).

It is clear to the person skilled in the art that catalysts of this kind are used in particular when the hotmelt adhesive composition contains silane groups, more particularly in the form of silane-grafted poly-α-olefins (P2).

Furthermore, the hotmelt adhesive composition advantageously contains further constituents. Further constituents are more particularly constituents which are selected from the group encompassing plasticizers, adhesion promoters, UV absorbers, UV stabilizers and heat stabilizers, optical brighteners, fungicides, pigments, dyes, fillers and drying agents.

If the hotmelt adhesive composition comprises silane-grafted poly-α-olefin (P2) as thermoplastic polyolefin (P), the silane groups undergo hydrolysis as a result of the influence of water, more particularly in the form of atmospheric moisture, to form silanol groups (—SiOH), which in turn react with one another and so lead, with the formation of siloxane groups (—Si—O—Si—), to the crosslinking of the hotmelt adhesive composition. Hotmelt adhesive compositions of this kind are referred to as reactive hotmelt adhesives.

It is therefore advantageous to ensure that at least those hotmelt adhesive compositions which contain silane-grafted poly-α-olefins (P2) are prepared using raw materials that have been dried as well as possible, and that, during the production, storage and application, the adhesives are as far as possible protected from contact with water or atmospheric moisture.

In principle, the preparation takes place in a customary manner known to the skilled worker for hotmelt adhesives.

The hotmelt adhesive compositions are liquefied on heating, by melting of the thermoplastic ingredients. The viscosity of the hotmelt adhesive compositions ought to be adapted to the application temperature. The application temperature is commonly 100 to 200° C. At this temperature the adhesive can be processed effectively. The viscosity in this temperature range is preferably 2000-50 000 mPas. If it is substantially higher, application is very difficult. If it is substantially lower, the adhesive is so thin that on application it runs away from the surface of the material that is to be bonded, before solidifying as a result of cooling.

The solidification and consolidation of the adhesive that take place as a result of cooling produce a rapid increase in strength and high initial adhesive strength for an adhesively bonded assembly. When using an adhesive it is necessary to ensure that bonding takes place within a time in which the adhesive has not yet cooled too sharply; in other words, bonding must take place while the adhesive is still liquid, or at least still tacky and deformable. If the hotmelt adhesive compositions are reactive, i.e. if they contain silane-grafted poly-α-olefins (P2), the adhesive, even after cooling, will continue crosslinking under the influence of water, more particularly of atmospheric moisture, and so within a short time of commonly a few hours or days will continue to gain in mechanical strength. In contrast to the non-reactive hotmelt adhesive compositions, reactive hotmelt adhesive compositions cannot be heated reversibly and so liquefy again. Accordingly the use of silane-grafted poly-α-olefins (P2) is advantageous more particularly for those applications in which the bonded assembly comes into contact with high temperatures in the course of its service, or its life, without the bond suffering damage. The use of silane-grafted poly-α-olefins (P2) is also advantageous in that, owing to the crosslinking, such adhesives exhibit significantly less creep.

It has emerged that the above-described hotmelt adhesive compositions can be used to excellent effect for the adhesive bonding of polyolefin films. With more particular preference they are used as laminating adhesives for the adhesive bonding of polyolefin films.

A further aspect of the invention relates to an assembly which comprises a polyolefin film (PF), an above-described hotmelt adhesive composition (K), and (where the hotmelt adhesive compositions comprise silane-grafted poly-α-olefins (P2)) an above-described hotmelt adhesive composition (K') which is crosslinked by the influence of water, and also a substrate (S).

In this assembly, the hotmelt adhesive composition, or the crosslinked hotmelt adhesive composition, is disposed between polyolefin film and substrate (S).

FIG. 1 represents, schematically, an assembly (1) of this kind which comprises a polyolefin film (PF) and a substrate (S) and also a hotmelt adhesive composition (K), respectively a hotmelt adhesive composition (K') crosslinked by the influence of water, which is disposed between polyolefin film and substrate and so bonds these two substrates to one another.

By "polyolefin film" is meant, more particularly, flexible, flat polyolefins in a thickness of 0.05 millimetre to 5 millimetres, which can be rolled up. Accordingly, as well as "films", in the strict sense of thicknesses below 1 mm, also included are sealing membranes, of the kind used commonly to seal tunnels, roofs or swimming pools, in a thickness of typically 1 to 3 mm, in special cases in a thickness even of up to not more than 5 mm. Polyolefin films (PF) of this kind are produced typically by spreading, casting, calendering or extrusion and are commonly available commercially as rolls or produced on site. They may be of single-layer or multi-layer construction. It is clear to the person skilled in the art that polyolefin films as well may also comprise other additives and processing agents, such as fillers, UV and heat stabilizers, plasticizers, lubricants, biocides, flame retardants, antioxidants, pigments such as titanium dioxide or carbon black, for example, and dyes. In other words, the term "polyolefin films" also applies to those films which are not composed 100% of polyolefins.

The substrate (S), in many cases also referred to as support, may be of a variety of types and natures. The substrates may be, for example, of metal, painted metal, of plastic, wood, wood-based materials or fibre materials. The substrate is preferably a solid, shaped body.

More particularly the substrate (S) is a fibre material, more particularly a natural fibre material.

As and when required, the surface of the substrate (S) may have been pretreated. Such pretreatment may constitute, more particularly, cleaning or the application of a primer. With preference, however, the application of primers is not necessary.

The assembly described is preferably an article of industrial manufacture, more particularly an article for interior fitment, preferably a component for installation in a means of transport, or an article of the furniture sector.

Particular importance attaches to the use for the production of interior trim parts of vehicles, more particularly of cars. Examples of such interior trim parts are door side parts, switch panels, parcel shelves, roof panel linings, sliding-roof panel linings, centre consoles, glove boxes, sun visors, pillars, door handles, arm rests, floor assemblies, loading-floor assemblies and boot assemblies, and also sleeping-cab walls and rear walls of vans and trucks.

A further aspect of the present invention is a method of producing a composite material, of the kind just described. This method comprises the steps of
  (i) melting an above-described hotmelt adhesive composition
  (ii) applying the melted hotmelt adhesive composition to a polyolefin film (PF)
  (iii) heating the polyolefin film
  (iv) contacting the substrate (S) with the melted hotmelt adhesive composition.

Used for this purpose more particularly is a vacuum forming process or a press lamination in the sealing process.

In the case of the vacuum forming process, the polyolefin film (PF) (decorative element comprising air-impermeable material) is typically clamped in an airtight manner into a frame. Beneath the film there is a bottom mould, onto which the support is placed. Bottom mold and support have drill holes or are air-permeable. The apparatus is closed off in an airtight manner additionally towards its bottom. When the air is withdrawn from this apparatus under suction, the decorative material then conforms accurately to the support component, under the atmospheric pressure bearing on the surface of the decorative material. The decorative material is heated prior to application of the vacuum or underpressure. The decorative material is impermeable to air, owing to the vacuum or underpressure that is to be produced.

It is particularly advantageous in this context that the adhesive can be applied directly to the polyolefin film and not to the carrier, as is the case, for example, with polyurethane dispersion-based adhesives.

Accordingly the step of contacting takes place more particularly under an applied pressure, more particularly between 0.1 bar and 1 bar, preferably at least 0.8 bar (corresponding. to the application of a vacuum of up to 0.9 bar, preferably of at least 0.2 bar).

The applied pressure is generated by the application of an underpressure in the space between substrate (S) and polyolefin film (PF). The abovementioned applied pressure is therefore produced in particular by the application of an underpressure of up to 0.9 bar, preferably of at lest 0.2 bar.

The step of contacting takes place preferably at an adhesive temperature of 50° C. or more, more particularly a temperature between 50 and 200° C., preferably between 100 and 150° C.

In the case of the press lamination process, the melted hotmelt adhesive composition is applied either to the support and/or to the polyolefin film (PF) (decorative element). The adhesive bonding of the support to the decorative element takes place preferably under the influence of heat, with joining and pressing.

The polyolefin films utilized here are in many cases decorative films and have a surface structure. This surface structure on the polymeric film may be introduced by embossing, for example, before or during or after adhesive bonding.

An essential and completely surprising feature of the present invention is the fact that, on the one hand, the hotmelt adhesive compositions described are capable of reliable adhesive bonding of polyolefins, which by virtue of their chemical structure are known to be extremely adhesion-unfriendly apolar materials, and are capable of this even without the use of special primers or of surface modifying techniques, such as plasma treatments or gas-phase fluorination, and that, on the other hand, nevertheless, the hotmelt adhesive compositions adhere not at all, or only very minimally to Teflon-coated surfaces of application tools, more particularly of rollers, dies or laminating tools.

EXAMPLES

TABLE 1

| Characterization of the raw materials used, and their abbreviation. | |
|---|---|
| P1-1 | atactic poly-α-olefin (APAO)(high propene content) molecular weight (Mn): 18 100 g/mol, melt viscosity (190° C., DIN 53 019): 50 000 mPa · s, softening temperature (ring & ball): 107° C. |
| P2-1 | silane-grafted poly-α-olefin, molecular weight (Mn): 10 600 g/mol, melt viscosity (190° C., DIN 53 018): 5000 mPa · s, softening temperature (ring & ball): 98° C. |
| P2-2 | silane-grafted polyethylene (poly-α-olefin) (obtained by metallocene catalysis) (10% by weight of grafted vinyltrimethoxysilane) softening temperature: about 80° C. melt viscosity (140° C. DIN 53 018): about 250 mPa · s |
| P2-3 | silane-grafted poly(propylene/ethylene) (poly-α-olefin) (obtained by metallocene catalysis) melt viscosity (170° C. DIN 53 018): about 100 mPa · s, dropping point: about 80° C. density: about 0.90 g/cm³ silane content: about 10% by weight (grafting agent: vinyltriethoxysilane) |
| TPE-1 | linear polycaprolactone copolyester urethane (thermoplastic polyester) melt flow index (DIN 53.735, 170° C., 2.16 kg): 30-60 g/10 min OH number: <3 mg KOH/g melt viscosity (130° C., DIN 53.735): 950 Pa · s |
| Stab | sterically hindered phenolic antioxidant from the Irganox ® series from Ciba Specialty Chemicals |

Adhesive compositions were produced by combining the ingredients in the parts by weight specified in Table 2 with one another at a temperature of 180° C. under an inert atmosphere in a stirrer mechanism.

Test Methods.

Viscosity

After the respective hotmelt adhesive in a sealed tube had been melted in an oven at 140° C. for 20 minutes, 12.3 mg of adhesive were weighed out into a disposable sleeve and conditioned for 20 minutes in the viscometer at the respective temperature reported in Table 2. The viscosity was measured at 5 (160° C.) or 10 (180° C.) revolutions per minute on a Brookfield DV-2 Thermosel viscometer with spindle No. 27. The viscosity selected is the figure which applies after 5 minutes' measurement. In Table 2 the figure measured at 160° C. is reported as "$\text{Visc}_{160}$" and the figure at 180° C. as "$\text{Visc}_{180}$".

Softening Point

The softening point of the compositions was measured by the ring&ball method along the lines of DIN 52011 and reported in Table 2 as "$T_{r\&b}$".

Peel Strength

To determine the peel strength, first of all the respective adhesive composition was heated to a temperature of 160° C., with melting. Using a squeegee a 500 μm film of adhesive is applied to a piece of silicone paper. This is done at 200° C. on a hotplate. Cut-to-size pieces of a thermoplastic polyolefin film (TPO film, manufacturer: Benecke Kaliko, thickness: 2.8 mm, not primer-treated) are subsequently inserted into the film of adhesive at 200° C. After the adhesive has been transferred, the coated film is removed from the hotplate, and so the adhesive is able to set.

For the adhesive bonding of the thus-precoated film to the metal test panel (Teflon-coated steel panel, coating: TempCoat® 1008F, Impreglon), the film on the reverse side, i.e. the film of adhesive, is heated to 205° C. using an IR source. After the desired temperature has been reached, pressing takes place onto the metal test panel by means of a platen press. The duration of pressing is 10 s. The pressing pressure is 0.3 MPa. After cooling has taken place and the adhesive has solidified, the composite strength between film and metal test panel is determined in the form of the roller peel strength (a handling time of approximately 30 min is required between laminating and testing). For the roller peel test, pulling takes place at 100 mm/min. The machine used is the Zwick Z020 tensile test machine.

The maximum peel strength figure measured in the course of this testing is identified in Table 2 as "$\text{SF}_{max}$", while the average peel strength value measured is identified as "$\text{SF}_x$".

A value for $\text{SF}_{max}$ of less than 7.5 N/5 cm is considered an acceptable value for low adhesion to Teflon. Particularly desired, however, are values of less than 5 N/5 cm. An additional desire is that the value for $\text{SF}_x$ should be substantially lower than that for $\text{SF}_{max}$; with particular advantage the ratio of $\text{SF}_x/\text{SF}_{max}$ is less than 0.5, preferably less than 0.4.

TABLE 2

| Hotmelt adhesive compositions and test results. | | | | | | |
|---|---|---|---|---|---|---|
|  | 1 | 2 | 3 | Ref. 1 | Ref. 2 | Ref. 3 |
| P1-1 | 20 | 20 | 20 | 20 | 20 | 20 |
| P2-1 | 50 | 50 | 50 | 50 | 50 | 50 |
| P2-2 | 10 | 10 |  |  |  |  |
| P2-3 |  |  | 10 | 10 | 10 | 10 |
| TPE-1 | 10 | 15 | 10 | 10 | 10 | — |
| Erucamide | 10 | 5 | 10 | — | — | 10 |
| Stab | 0.6 | 0.6 | 0.6 | 0.6 | 0.6 | 0.6 |
| DBTL | 0.1 | 0.1 | 0.1 | 0.1 | 0.1 | 0.1 |
| $\text{Visc}_{160}$ [Pas] | 16.8 | 25.7 | 26.0 | 18.1 | 13.1 | 11.1 |
| $\text{Visc}_{180}$ [Pas] | 12.1 | 19.7 | 19.7 | 12.1 | 8.1 | 7.8 |
| $T_{r\&b}$ [° C.] | 98 | 95 | 101 | 90 | 117 | 97 |
| $\text{SF}_{max}$ [N/5 cm] | 2.3 | 7 | 3.5 | 9.8 | 24.2 | 13.2 |
| $\text{SF}_x$ [N/5 cm] | 0.9 | 4.9 | 1.3 | 6.4 | 11.9 | 7.0 |

For none of the adhesive compositions tested an adhesive fracture pattern was found on the polyolefin film.

The invention claimed is:

1. Hotmelt adhesive composition comprising
   at least one atactic poly-α-olefin (APAO) (P1) being solid at 25° C.,
   at least one thermoplastic polyester (TPE) being solid at 25° C., and at least one amide (A) of the formula (I) or (II)

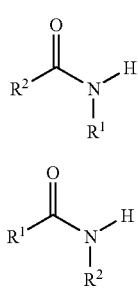

where $R^1$ is H, a $C_1$-$C_4$-alkyl group or a benzyl group and $R^2$ is a saturated or unsaturated $C_8$-$C_{22}$-alkyl group.

2. Hotmelt adhesive composition according to claim 1, wherein the hotmelt adhesive composition further comprises a silane-grafted poly-α-olefin (P2).

3. Hotmelt adhesive composition according to claim 1, wherein the atactic poly-α-olefin (APAO) (P1) is a silane-grafted atactic poly-α-olefin.

4. Hotmelt adhesive composition according to claim 1, wherein $R^2$ is an unsaturated $C_8$-$C_{20}$-alkyl radical.

5. Hotmelt adhesive composition according to claim 1, wherein $R^2$ is a $C_8$-$C_{22}$-alkyl radical.

6. Hotmelt adhesive composition according to claim 1, wherein the amide (A) has the formula (I) and $R^1$ is H.

7. Hotmelt adhesive composition according to claim 1, wherein the amide (A) is selected from the group consisting of lauryl-, myristyl-, palmityl-, stearyl-, arachidyl-, tuberculostearyl-, palmitoleyl-, oleyl-, linoleyl-, linolenyl-, elaeostearyl-, erucyl- and arachidonylamide.

8. Hotmelt adhesive composition according to claim 1, wherein the amide (A) has a melting point of between 40 and 150° C.

9. Hotmelt adhesive composition according to claim 1, wherein the hotmelt adhesive composition contains an amount of amide (A) of ≧5% by weight based on the hotmelt adhesive composition.

10. Hotmelt adhesive composition according to claim 1, wherein the thermoplastic polyester (TPE) is a linear polycaprolactone copolyester urethane.

11. Hotmelt adhesive composition according to claim 1, wherein the hotmelt adhesive composition contains an amount of thermoplastic polyester (TPE) of 5%-30% by weight based on the hotmelt adhesive composition.

12. Hotmelt adhesive composition according to claim 1, wherein the hotmelt adhesive composition further comprises at least one catalyst which catalyzes the reaction of silane groups.

13. Hotmelt adhesive composition according to claim 1, wherein the hotmelt adhesive composition contains an amount of thermoplastic polyolefin (P) of ≧50% by weight based on the hotmelt adhesive composition.

14. A method of bonding, comprising bonding polyolefin films using the hotmelt adhesive composition according to claim 1.

15. The method of claim 14, wherein the hotmelt adhesive is a laminating adhesive.

16. Assembly comprising:
    a polyolefin film (PF);
    a hotmelt adhesive composition according to claim 1, and
    a substrate (S);
    the hotmelt adhesive composition, being disposed between the polyolefin film (PF) and the substrate (S).

17. Assembly according to claim 16, wherein the substrate (S) is a fibre material.

18. Assembly according to claim 16, wherein the assembly is an article of industrial manufacture.

19. Method of producing the assembly according to claim 16, comprising:
    (i) melting the hotmelt adhesive composition;
    (ii) applying the melted hotmelt adhesive composition to the polyolefin film (PF);
    (iii) heating the polyolefin film (PF); and
    (iv) contacting the substrate (S) with the melted hotmelt adhesive composition.

20. Method according to claim 19, wherein contacting takes place under an applied pressure.

21. Method according to claim 20, wherein the applied pressure is generated by the application of an underpressure in the space between the substrate (S) and the polyolefin film (PF).

22. Method according to claim 20, wherein contacting takes place at an adhesive temperature of 50° C. or more.

23. Hotmelt adhesive composition according to claim 2, wherein a weight ratio of atactic poly-α-olefin (APAO) (P1) to silane-grafted poly-α-olefin (P2) is between 5:1 and 1:5.

24. Hotmelt adhesive composition according to claim 2, wherein a weight ratio of atactic poly-α-olefin (APAO) (P1) to silane-grafted poly-α-olefin (P2) is between 1:1 and 1:4.

\* \* \* \* \*